US008328215B2

(12) United States Patent
Knopf

(10) Patent No.: US 8,328,215 B2
(45) Date of Patent: Dec. 11, 2012

(54) WHEELCHAIR HAVING PIVOTING BACKREST FRAME ASSEMBLY

(75) Inventor: Michael Knopf, Dielheim (DE)

(73) Assignee: Sunrise Medical GmbH & Co. KG, Malsch, Heidelberg (DE)

( * ) Notice: Subject to any disclaimer, the term of this patent is extended or adjusted under 35 U.S.C. 154(b) by 241 days.

(21) Appl. No.: 12/697,754

(22) Filed: Feb. 1, 2010

(65) Prior Publication Data

US 2010/0194162 A1 Aug. 5, 2010

(30) Foreign Application Priority Data

Jan. 30, 2009 (EP) ..................................... 09151779

(51) Int. Cl.
*B62M 1/14* (2006.01)

(52) U.S. Cl. ................. 280/250.1; 297/354.12; 297/364

(58) Field of Classification Search ............... 280/250.1, 280/304.1; 297/354.12, 364; 277/600
See application file for complete search history.

(56) References Cited

U.S. PATENT DOCUMENTS

| | | | | |
|---|---|---|---|---|
| 2,010,569 | A * | 8/1935 | Sitzler | 29/520 |
| 2,515,361 | A * | 7/1950 | Vance | 313/595 |
| 3,138,400 | A * | 6/1964 | Reid | 297/19 |
| 3,784,252 | A * | 1/1974 | Peterson | 297/364 |
| 4,655,471 | A * | 4/1987 | Peek | 280/250.1 |
| 5,152,543 | A * | 10/1992 | Sims et al. | 280/250.1 |
| 6,032,976 | A * | 3/2000 | Dickie et al. | 280/650 |
| 7,007,965 | B2 * | 3/2006 | Bernatsky et al. | 280/304.1 |
| 7,192,042 | B2 * | 3/2007 | Cerreto | 280/250.1 |
| 7,393,057 | B2 * | 7/2008 | Fraser | 297/392 |
| 2006/0170183 | A1 * | 8/2006 | Wendt | 280/250.1 |

FOREIGN PATENT DOCUMENTS

| | | |
|---|---|---|
| CN | CH689177 A5 | 11/1998 |
| DE | 102006014374 | 10/2007 |
| EP | 1743613 | 1/2007 |
| FR | 2845893 | 4/2004 |

OTHER PUBLICATIONS

European Search Report, EP09151770, Jul. 1, 2009.

* cited by examiner

*Primary Examiner* — Tony Winner
(74) *Attorney, Agent, or Firm* — MacMillan, Sobanski & Todd, LLC

(57) ABSTRACT

A wheelchair comprises a base frame, a backrest frame and a hinge assembly. The base frame has first and second side frame members. The hinge assembly connects the backrest frame to a portion of the base frame for selective pivotal movement. The hinge assembly includes a locking mechanism configured to provide selective discrete locking positions of the backrest relative to the base frame. The locking mechanism includes a locking pin and a plurality of cooperating locking apertures. The locking pin is adapted to selectively engage one of the plurality of locking apertures to define a backrest angle relative to the base frame. One or more plugs are adapted to engage one or more of the plurality of locking apertures to prevent the locking pin from cooperating with the plugged locking aperture.

20 Claims, 8 Drawing Sheets

WHEELCHAIR HAVING PIVOTING BACKREST FRAME ASSEMBLY

CROSS-REFERENCE TO RELATED APPLICATIONS

This application claims priority from European Patent Application No. EP09151779, filed Jan. 30, 2009, the disclosure of which is incorporated herein by reference.

BACKGROUND OF THE INVENTION

This invention relates in general to wheelchairs, and in particular, to wheelchairs having pivoting backrest structures.

Wheelchairs are provided with seating structures to comfortably accommodate a user in a seated position, often for a prolonged period. One feature provided to increase user comfort is the ability to position the backrest relative to the seat bottom. The backrest may be pivotally mounted to a frame portion of the wheelchair by way of a hinge element. The frame portion may also support the seat bottom. A latching structure may be provided to fix the position of the backrest relative to the seat bottom.

In order to provide ease of portability, some backrests are foldable to a stowed position to reduce the package size for transporting the wheelchair. Some pivoting backrests are provided with separate latching mechanisms to provide backrest position adjustments and to fold or stow the backrest. These separate latches allow a user to unfold and return the backrest to a prior use position without having to readjust the position settings. Though adequate for transitioning between a stowed and a use position, the two locking mechanisms are each strong enough to hold the seatback in position and each include separate release componentry. These extra parts increase complexity and weight.

Thus, it would be desirable to provide a wheelchair with a pivoting and folding backrest that is of relatively simple construction. It would be further desirable to provide a single, integrated hinge and latching mechanism that allows for small adjustments of the frame relative to a first configuration and a large adjustment to a second configuration with subsequent easy return to the previous adjusted first configuration.

SUMMARY OF THE INVENTION

This invention relates to a wheelchair that comprises a base frame, a backrest frame and a hinge assembly. The base frame has first and second side frame members. The hinge assembly connects the backrest frame to a portion of the base frame for selective pivotal movement. The hinge assembly includes a locking mechanism configured to provide selective discrete locking positions of the backrest relative to the base frame. The locking mechanism includes a locking pin and a plurality of cooperating locking apertures. The locking pin is adapted to selectively engage one of the plurality of locking apertures to define a backrest angle relative to the base frame. One or more plugs are adapted to engage one or more of the plurality of locking apertures to prevent the locking pin from cooperating with the plugged locking aperture.

The wheelchair may also include a headrest assembly having an upright member configured to support a headrest and a clamp body that connects the upright member to the cross member. The clamp body has an array of apertures that define selectable angular positions of the headrest relative to the backrest frame member. A locking pin is configured to selectively engage one of the array of apertures to fix the headrest position. At least one plug configured to engage one or more of the apertures in the array to limit the selectable positions of the headrest In addition to either the hinge assembly or the headrest assembly, or both, the wheelchair may include at least one side guard connected to the backrest frame and the base frame. The at least one side guard has an array of apertures configured for selective attachment to a portion of the base frame. At least one plug is configured to engage at least one aperture of the side guard to prevent selection of the aperture in a use position of the backrest.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
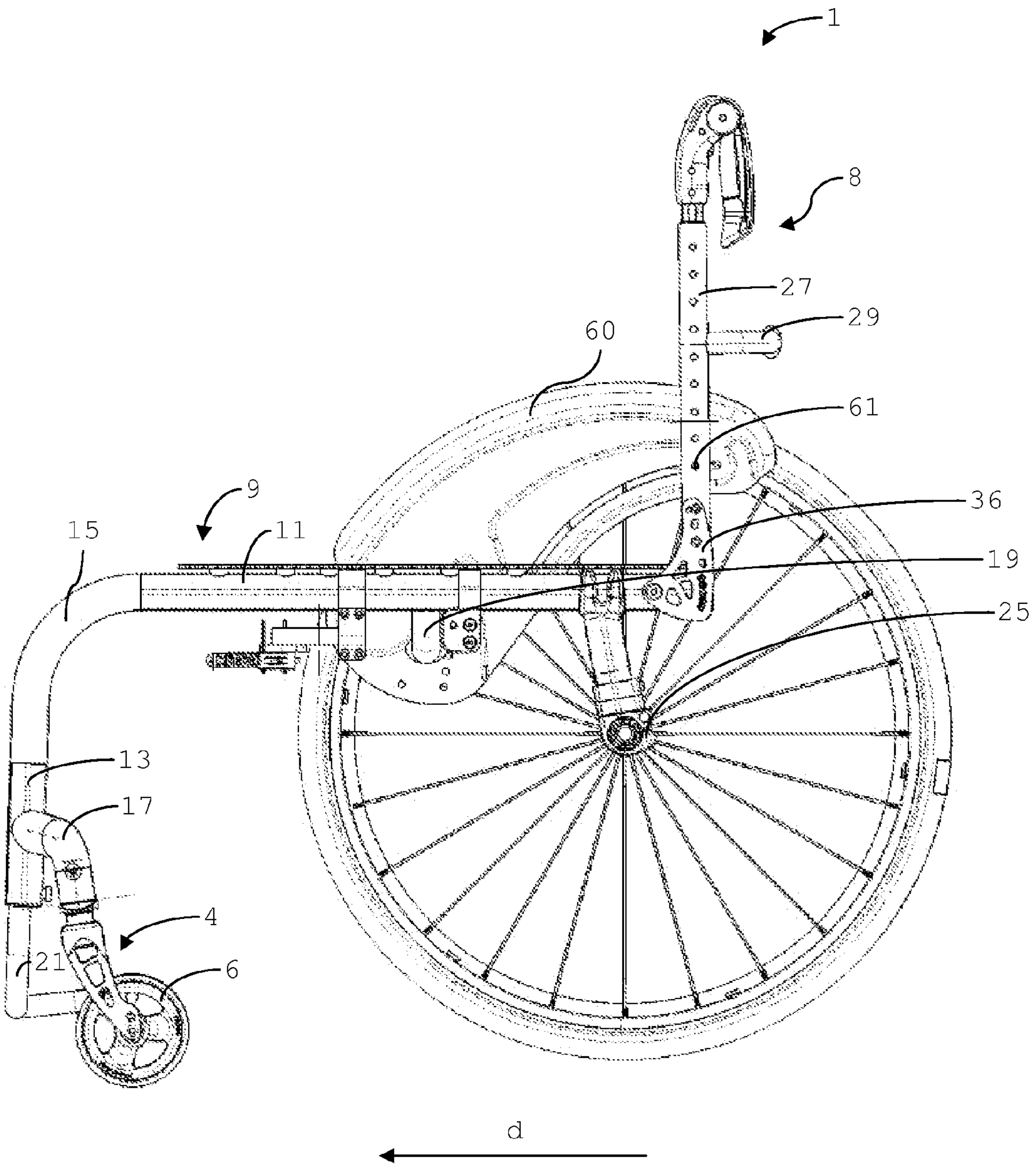
FIG. 1 is an elevational view of an embodiment of a wheelchair frame with one drive wheel removed for clarity.
Figure 2:
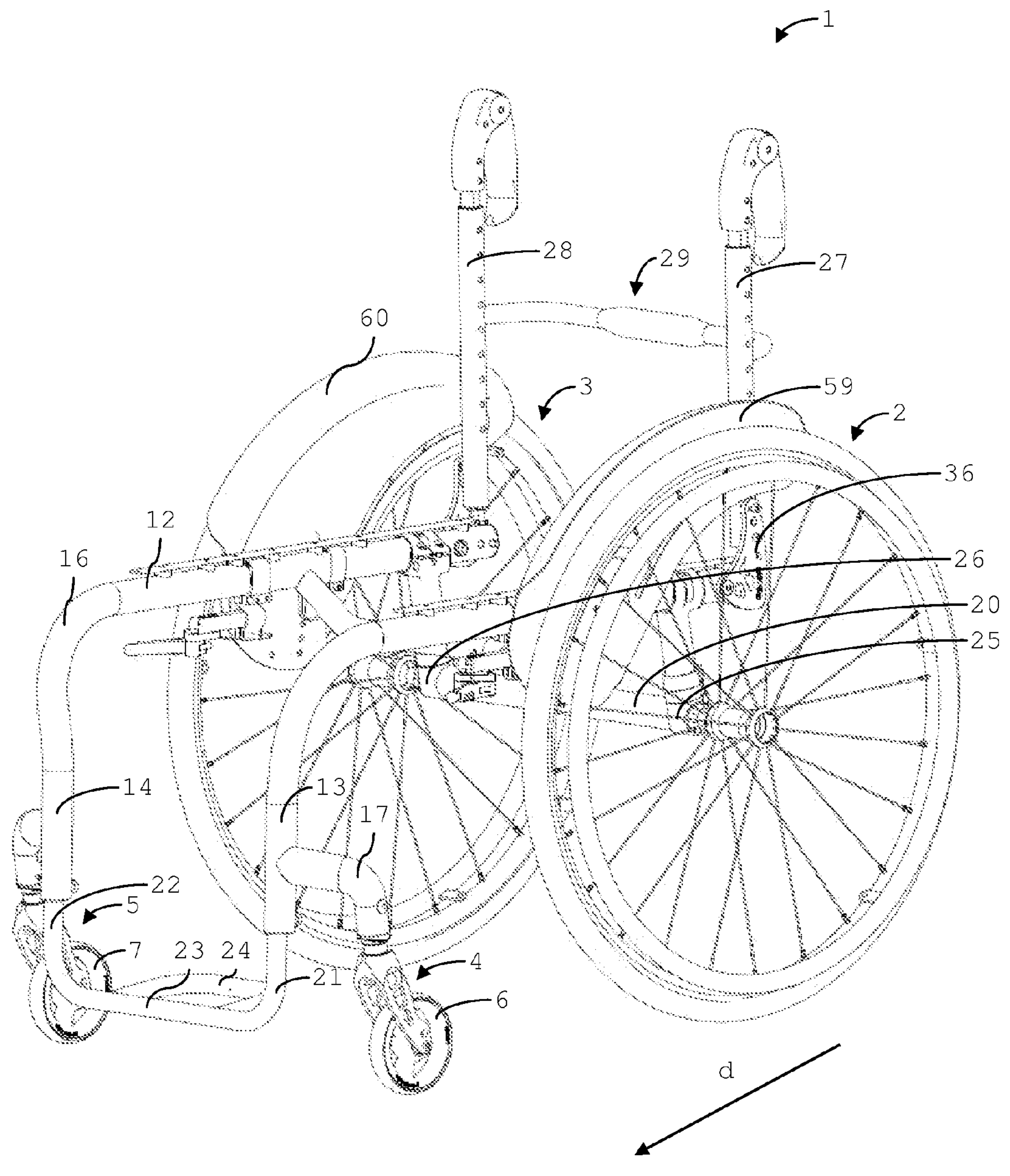
FIG. 2 is a perspective view of the wheelchair frame of FIG. 1 with both drive wheels mounted to the frame.
Figure 3:
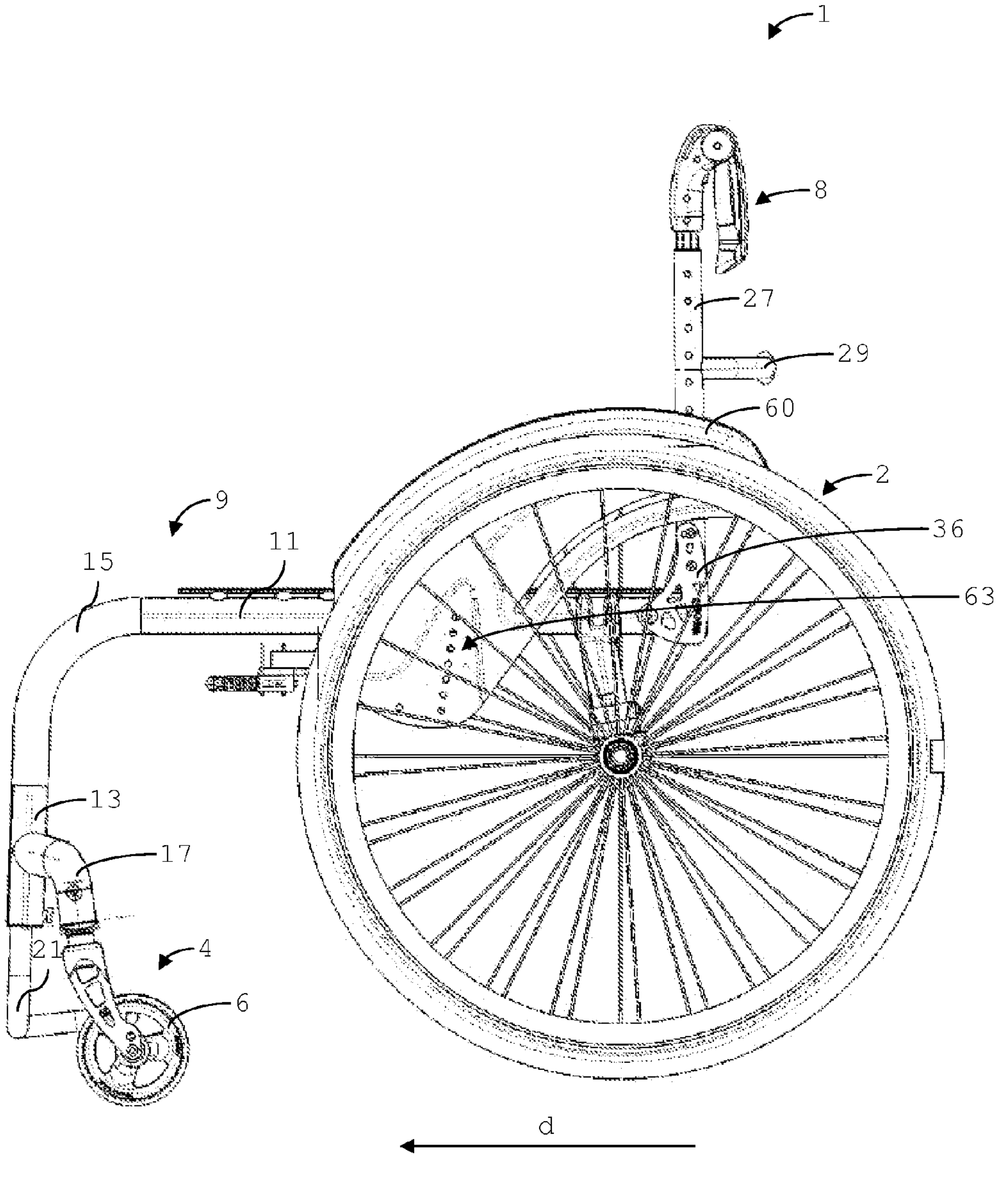
FIG. 3 is a side elevational view of the wheelchair frame of FIG. 2.

A wheelchair frame assembly, as shown and described, provides a hinge and latch assembly having a mechanical memory device. The hinge memory device may be a hinge sub-assembly with at least one component including at least one plug for insertion into one of a plurality of apertures. The plurality of apertures may be laid out in an array having a specific relative spacing. In one embodiment, the relative spacing may be in the form of an equally spaced series of apertures arranged in an arc. The at least one plug is configured to occupy at least a part of at least one aperture while allowing movement of a latch engagement member or members past the aperture.

In an embodiment of a wheelchair frame assembly, a second frame member is connected to a first frame member to guide movement of the first frame member relative to the second frame member. The connection between the first frame member and the second frame member allows movement of the engagement member past the array of apertures and beyond the array of apertures.

In a variant of this embodiment, the connection between the first and second frame members allows relative movement to a position in which the first and second frame members are predominantly parallel and positioned alongside each other.

In an embodiment of the wheelchair frame assembly, at least one of the first and second frame members is of a tubular construction.

An embodiment of a hinge and latch assembly may include a hinge plate provided with the array of apertures. The hinge plate may be mounted in a generally fixed position on one of the first and second frame members.

In an embodiment of the hinge and latch assembly, the hinge plate provided with the array of apertures is fixed in position relative to one of the first and second frame members and attached for pivotal movement to the other of the first and second frame members.

In a further embodiment of a hinge and latch assembly, at least one hinge plate includes at least one plug. In another embodiment, the at least one plug may be a plurality of interconnected plugs for simultaneous insertion into a plurality of apertures.

In yet a further embodiment of a hinge and latch assembly, a hinge plate may include at least one plug. A fixing device, such as a latch pin assembly, is provided to selectively engage at least one of the apertures for releasably fixing a first frame member relative to a second frame member.

In a further embodiment, one of the first and second frame members is arranged to support a backrest of a wheelchair.

According to another aspect of the invention, a wheelchair includes a frame assembly and a hinge and latch assembly according to the invention.

In an embodiment of the wheelchair, one of the first and second frame members is a base frame and the other of the first and second frame members is a backrest frame.

A wheelchair having a frame assembly and a hinge and latch assembly, as shown and described, is based on the surprising insight that, by providing at least one component comprising a plug for insertion into one of the apertures so as to occupy at least a part of the aperture, an adjusted configuration can be chosen and retained by inserting the plug(s) into unused apertures. When one portion of the frame assembly is returned to a position prior to folding, only unblocked apertures are available for establishing a lock with the one or more engagement member(s). Because the at least one component with the at least one plug, when inserted into the aperture(s), allows movement of the engagement member(s) past the aperture(s), the frame can be completely unfolded to the previous configuration.

In an alternative embodiment of a frame assembly having a hinge and latch assembly, the component having an array of apertures may be a section of one of the first and second frame members. Alternatively the component may be a hinge plate that is integrally formed with one of the first and second frame members.

In another embodiment, the second frame member may be connected to the first frame member to guide movement of the first frame member relative to the second frame member. The connection between the first frame member and the second frame member may also allow movement of the engagement member(s) past the array of apertures and beyond the array of apertures. In this arrangement, the frame can be collapsed or folded without the need for a further, releasable, locking mechanism between the first and second frame members. In particular, it is not necessary to provide a connecting member with adjustable length, such as one comprising telescoping frame tubes, which saves weight. When collapsed or folded, the first and second frame members are still held together, if the main frame is being collapsed. The result is a folded package that is relatively easy to transport. Even when folding the frame results in a reconfiguration of the frame assembly that does not necessarily make the wheelchair more compact, the frame is still easier to handle because the first and second frame members are held together.

If the connection between the first and second frame members allows relative movement to a position in which the first and second frame members are generally parallel and positioned alongside each other, then the sub-assembly can be folded to a relatively compact configuration, e.g. for transport. The positions determined by the array of apertures and the placement of the engagement member(s) can be such as to place the first and second frame members in a configuration in which they are predominantly transverse to each other.

Where at least one of the first and second frame members is of a tubular construction, a strong, rigid and lightweight frame is provided.

Where the component provided with the array of apertures is mounted in a generally fixed position on one of the first and second frame members, the frame members need not include the apertures. This eliminates a potential stress riser so the frame can be stronger or, in the case of tubular members, can have a lower wall thickness to meet the strength requirements. Furthermore, the first and second frame members can move past each other rather than along each other. The component provided with the array of apertures can be adapted to a path of movement that is quite independent of the shape of the first and second frame members.

If the array of apertures is provided in a plate, such as a hinge plate, then the frame members need also not be provided with the apertures. Especially where the frame members are of a tubular construction, this avoids points of weakness of the tubular frame members. The plate can be strengthened relatively easily to ensure that the apertures retain their shape. The plate also allows non-linear relative movement of the first and second frame members along a path not necessarily coincident with the central axis of one of the first and second frame members. Additionally, there can be more play between the plate and the moveable frame member than would be the case if the first and second frame members were to engage each other in a telescoping manner. Another effect of using a plate is that one can provide the array of apertures along a curved line of essentially any desired shape, simply by drilling and/or milling the apertures at the appropriate locations on the plate.

If the component provided with the array of apertures is fixed in position relative to one of the first and second frame members and pivotally attached to the other of the first and second frame members, a lightweight construction is provided. This arrangement enables one to position the first and second frame members at one of a plurality of slightly different angles relative to another and to fold them towards or away from each other, such that they are at a very different angle to each other. The weight saving is achieved by using the component both as the interconnection between the first and second frame members that guides their relative movement and as a component of the locking mechanism that locks or fixes their relative position.

In a variant of this embodiment, the component comprises a hinge plate, which ensures that there is a stiff connection between the first and second frame members when they are held at an angle to one another. Thus, the frame members can be longer and/or subject to greater forces in use. A triangular support provides the fixed connection to one of the first and second frame members and by the pivot connection to the other of the first and second frame members. It also provides the array of apertures for engagement with a portion of a latch mechanism into one of the apertures. By appropriately spacing apart these at least three points of connection, the connection between the first and second frame members can be made stronger.

If at least one component including at least one plug includes a plurality of interconnected plugs for simultaneous insertion into a plurality of the apertures, then there are fewer parts. Moreover, the edges of the apertures can provide a shape-lock function with corresponding mating portions of the plugs or array of plugs. The apertures and the aperture edges that engage portions of the latch mechanism can also be made smaller without the plugs becoming too small to handle.

If at least one component including at least one plug includes a fixing device for releasably fixing the component in position relative to at least one of the apertures, then a semi-permanent selection of one or more relative positions of the first and second frame members can be made.

Referring now to the drawings, there is illustrated in FIGS. 1-4 a wheelchair, shown generally at 1. The wheelchair 1 is supported by left and right rear main wheels 2, 3 and left and right caster wheel assemblies 4, 5, that include caster wheels 6, 7. The wheelchair 1 comprises a base frame and a backrest frame 8.

The base frame comprises left and right side frame members 9, 10, arranged on opposite sides of a central axis (not shown) that is aligned with a direction "d" of forward displacement of the wheelchair 1. The left and right side frame members 9, 10 are generally L-shaped. In other words, the wheelchair 1 has an open frame. The side frame members 9, 10 each extend longitudinally as a first leg 11, 12 and at a generally perpendicular angle as a second leg 13, 14. It should be understood that the first and second legs may be oriented at any relative angle. Each first leg 11, 12 transitions into a second leg 13,14 via a respective curved section 15, 16. The first legs 11, 12 extend generally horizontally, and the second legs 13,14 extend downwardly from the first legs by way of the curved sections 15, 16. It is noted that the angle of the first legs 11,12 to the horizontal can be adjusted by adjusting the rear height of the first legs 11,12 above ground. They are thus only illustrated as being oriented in a horizontal direction, not required to be horizontal.

The first legs 11, 12 are arranged for supporting a seat (not shown) of the wheelchair 1. In particular, a seat sling (not shown) can be connected between the first legs 11, 12 of the side frame members 9, 10, on top of which a seat cushion (not shown) of any shape or configuration can be placed.

In the illustrated embodiment, the curved sections 15, 16 of the side frame members 9, 10 are curved in multiple planes, such that the second legs 13, 14 are separated from each other by a shorter distance than the first legs 11, 12 of the side frame members 9, 10. The second legs 13, 14 support a structure or structures for supporting the wheelchair occupant's legs, such as a footrest. Thus, the seat can be relatively wide to comfortably accommodate a user, whereas the second legs 13, 14 of the side frame members 9, 10 can be more narrowly spaced to improve maneuverability.

The second legs 13, 14 are supported by the caster wheel assemblies 4, 5 via caster struts 17, 18. In the illustrated embodiment, a portion of the caster wheel assemblies 4,5 pivotally engages the caster struts 17, 18. The caster struts 17, 18 are shown having longitudinal ends that connect to the sides of the second legs 13, 14. In the illustrated embodiment, the caster struts 17, 18 extend outwardly and slightly rearwardly from the lower ends of the second legs 13, 14. The caster struts 17, 18 place the caster wheels 6, 7 at a wider distance from the longitudinal central axis of the wheelchair 1 to provide stability. The general rearward orientation of the caster struts 17, 18 places the caster wheels 6, 7 closer to the rear wheels 2, 3. This shortening of the wheelbase improves maneuverability. Because the wheelchair 1 has an open frame, the forward loads of the user are supported by the caster wheels 6,7 through the caster struts 17, 18 and second legs 13, 14. In turn, the user loads are transferred to the first legs 11, 12 of the side frame members 9, 10. No other connection is needed between the caster wheel assemblies 4, 5 and the first legs 11, 12 of the side frame members 9, 10.

For maneuverability and ease of use, it is desirable to place the rear wheels 2, 3 as close together as possible to the seat, and thus also as close to the side frame members 9, 10 as possible. The seat can then be wide enough to accommodate an occupant comfortably, but, the wheelchair 1 will be narrower for better maneuverability and access to buildings, transport means and the like. This profile is aided if the camber adjustment of the rear wheels 2, 3 is maintained when the wheelchair 1 is occupied. Therefore, the frame should be stiff or rigid enough to prevent "sagging", particularly excessive deflections due to rotation or torsion of the side frame members 9, 10 under the weight of the occupant. The frame rigidity influences any tendency of the wheels 2, 3 to angle inwards at the top, towards the first legs 11, 12, which may cause undesirable contact with the frame. To prevent this, the first legs 11,12 are directly connected by a first cross-brace 19 and indirectly by an axle tube 20. Additionally, a footrest assembly with left and right foot rest frame members 21, 22, are generally in alignment with and connected to the second legs 13, 14. The footrest assembly includes a first cross-member 23 that interconnects the left and right foot rest frame members 21, 22. A further cross-member 24 is situated below a foot plate (not shown) when moved to a use position.

The height of the foot rest assembly can be adjusted by telescoping the left and right foot rest frame members 21, 22 relative to the second legs 13,14. The left and right foot rest frame members 21, 22 may be fixed in one of a number of positions by fasteners such as, for example, resiliently biased pins in the foot rest frame members 21, 22 that cooperate with any of a series of holes in the second legs 13, 14 of the side frame members 9, 10.

The axle tube 20 is connected to the base frame via left and right axle tube clamps 25, 26. The interconnection between the axle tube clamp 25,26 and the first legs 11,12 allows for movement of the axle tube 20 at varying distances along the first legs 11, 12 of the side frame members 9, 10. The positions are at varying distances relative to the seat. In this manner, the rear seat height can be adjusted, because the axle tube 20 accommodates camber tubes (not shown in detail) that support the axles of the rear wheels 2, 3. The camber tubes are also held in position by the axle tube clamps 25, 26.

At least one of the camber tube and the axle is removable from the axle tube 20, so that the rear wheels 2, 3 can be taken off the wheelchair frame when the wheelchair 1 needs to be transported. Thus, the open ends of the axle tube 20 are configured to removably accommodate rear wheel axles.

The backrest frame 8 is pivotally connected to the base frame by a connection mechanism that enables left and right backrest frame members 27, 28 to be fixed in a generally upright position at any of several angles to the first legs 11, 12 of the side frame members 9, 10. Also, the backrest frame members 27, 28 can be folded and fixed in a generally parallel position to the first legs 11, 12 of the side frame members 9, 10. In this folded configuration, the wheelchair 1 can be transported easily, e.g. in the trunk of a car. It can be carried with one hand by the first cross brace 19 between the side frame members 9, 10 or a similar second cross-brace 29 provided between the backrest frame members 27, 28.

Figure 6:
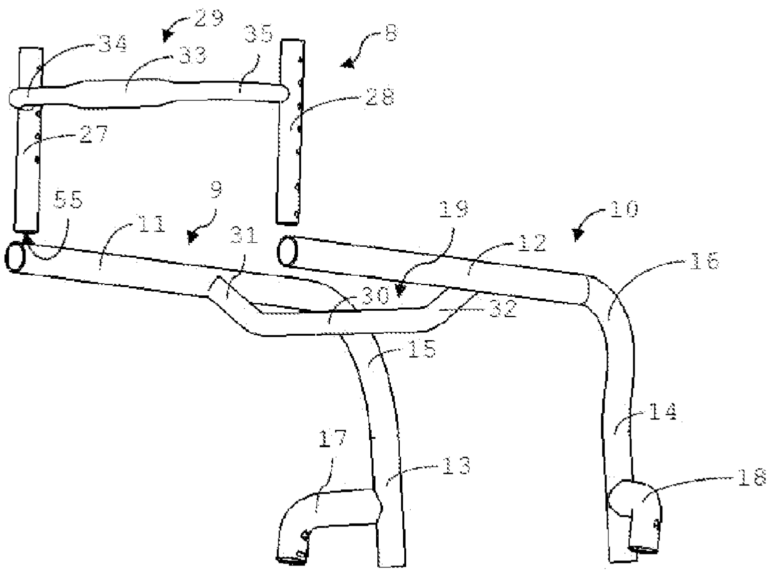
FIG. 6 is a perspective view of a base frame and a backrest frame of a wheelchair.
Figure 7:
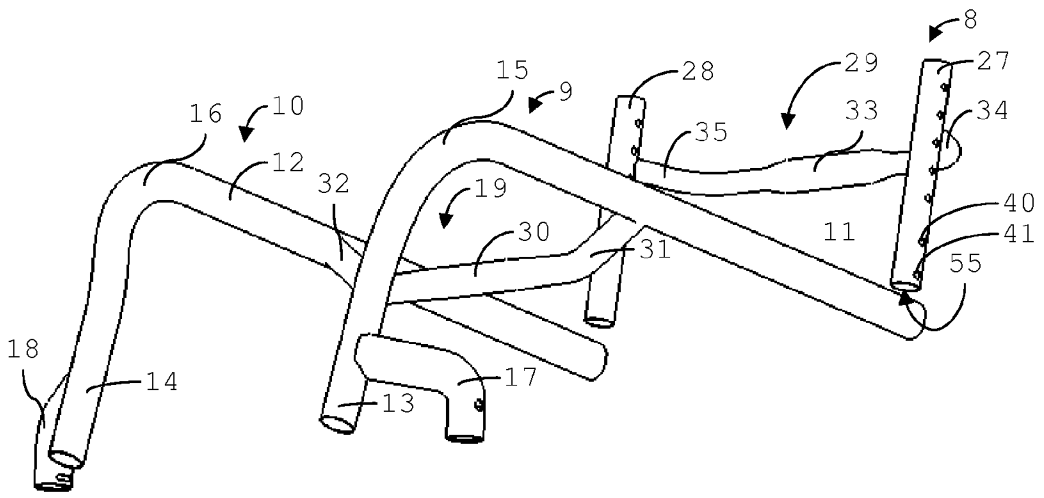
FIG. 7 is another perspective view of the base frame and backrest frame of the wheelchair of FIG. 6.

Referring now to FIGS. 6 and 7, the first cross-brace 19 is comprised of a tubular structure having a central section 30 and first and second end sections 31,32. The end sections 31, 32 of the cross-brace 19 are connected to the left and right side frame members 9, 10. The end sections 31, 32 each have a central longitudinal axis angled away from a plane defined by the first legs 11, 12 of the left and right side frame members 9, 10. In the illustrated embodiment, the angled orientation of the end sections 31, 32 is near the connection point of the left and right side frame members 9, 10. Thus, the central section 30 lies in a plane parallel to the plane defined by the first legs 11, 12. This provides a space between the central section 30 and a seat supported by the left and right first legs 11, 12. By angling the end sections 31, 32 in this way, the central section 30 can be relatively long, and need not be positioned exactly under the middle of the seat. In an alternative embodiment, the end sections 31, 32 are in the plane of the left and right first legs 11, 12 and curved sections, that angle out of this plane, are provided between the central section 30 and the end sections 31, 32.

In a similar configuration to the first cross-brace 19, the second cross-brace 29 is comprised of a tubular structure having a central section 33 and first and second end sections 34, 35. The end sections 34, 35 of the cross-brace 19 are connected to the left and right side backrest frame members 27, 28. The end sections 34, 35 each have a central longitudinal axis that is angled away from a plane defined by the backrest frame members 27,28. In the illustrated embodiment, the end sections 34, 35 angle away from the connection point of the left and right backrest frame members 27, 28. Thus, the central section 33 lies in a plane parallel to the plane defined by the backrest frame members 27, 28. This provides a space between the central section 33 and a backrest (not shown) supported by the left and right backrest frame members 27, 28. By angling the end sections 34, 35 in this way, the central section 33 can again be relatively long.

The members of the wheelchair frame can be made of a composite material or a metal or metal alloy. For example, lightweight materials such as aluminum-scandium alloys and 6000-series and 7000-series aluminum alloys may be used for the various frame members. The 7000 series aluminum alloys, particularly 7003 aluminum, have a relatively high tensile strength.

Figure 5:
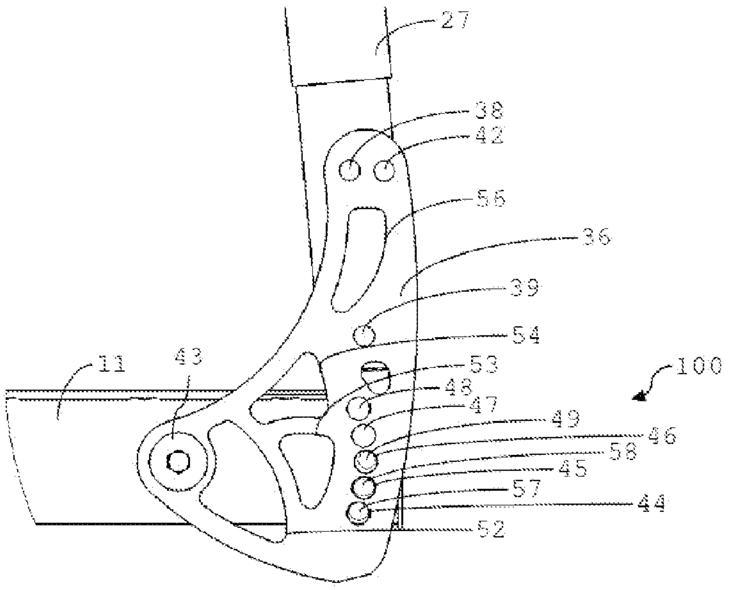
FIG. 5 is a side elevational view of an embodiment of a hinge plate for use in a seatback adjustment mechanism mounted on a portion of a wheelchair.

The interconnection between the left and right backrest frame members 27, 28 and the first legs 11, 12 of the side frame members 9,10 comprises left and right hinge plates 36, 37. The right hinge plate 37 is a mirror image of the left hinge plate 36, shown in FIG. 5 and as described in detail below.

The hinge plate 36 may be fixed in one of a number of pre-defined positions relative to the backrest frame member 27 by, for example, fasteners such as two bolts (not shown). The fasteners are inserted through respective through-holes 38, 39 and engage threaded bores 40, 41 (FIG. 7) in the backrest frame member 27. In other embodiments, other connection devices can be used. In the illustrated embodiment, an alternative through-hole 42 is provided for the top bolt, so that the hinge plate 36 can be fixed to the backrest frame member 27 at two different angles. The two different fixed angles of the backrest define two different ranges of angular adjustment, by the hinge plate 36, of the backrest frame member 27 relative to the first legs 11, 12. Alternatively, an elongated through-hole could be used, thus providing a continuous range of adjustment. This bolted adjustment is typically altered less frequently than the other adjustment features described below.

The hinge plate 36 is shown pivotally attached to the first leg 11 of the left side frame member 9 via a pivot axle 43 with an appropriate securing device (not shown in detail). It should be understood that the hinge plate 36 may be pivotally connected to portions of the backrest frame 27 or any other suitable structure on the frame assembly.

The hinge plate 36 is further provided with an array of apertures 44, 45, 46, 47, and 48, that form part of a locking mechanism 100. In the illustrated embodiment, the apertures 44-48 are arranged along a curved trajectory at generally constant intervals. In other embodiments, the intervals may vary, such that some of the apertures are grouped more closely together to provide a finer incremental angular adjustment. There are five apertures 44-48 in the illustrated embodiment, but there may be fewer or more in other embodiments. Although the apertures 44-48 shown in FIGS. 1-5 are circular, they can have any other cross-sectional shape, e.g. square, hexagonal, etc. In another embodiment, the apertures 44-48 are interconnected.

Figure 8:
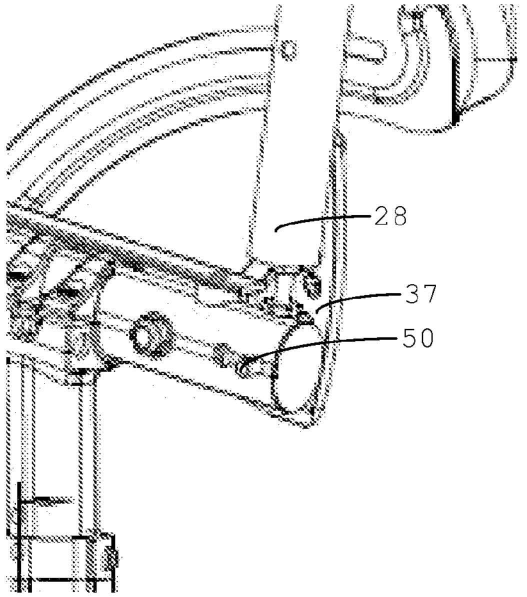
FIG. 8 is a detailed perspective view of an embodiment of a connection between a backrest frame member and a side frame member of a wheelchair frame.

The locking mechanism 100 also includes a cylindrical left locking pin 49 with a similar cross-sectional shape to the apertures 44-48 extends through the left side frame member 9 and is configured to protrude into a selected one of the apertures 44-48. A similar locking pin 50 is provided on the other side of the wheelchair 1 for use with the other hinge plate 37 (cf. FIG. 8). One or more resilient elements (not shown) bias the pin 49 into the engaged position with the hinge plate 36. The locking pin 49 can be retracted from the engaged position to a released position to permit movement of the hinge plate 36 past the pin 49 and left side frame member 9. A flexible cord 51 (FIG. 4) interconnects the locking pins 49, 50 so that they can be retracted simultaneously by pulling the cord 51 with one hand. Other interconnection mechanisms can be used. It is also possible to provide a mechanism for retaining the pin 49 in the retracted position, e.g. by turning it upon retraction.

The array of apertures 44-48 is arranged along a curved trajectory, such that, with the pin 49 in the retracted position, the end of the pin 49 moves past each of the apertures 44-48 in turn. The array of apertures 44-48 is configured to move past and beyond the pin 49 when the backrest frame 8 is folded down onto the seat.

In the illustrated embodiment, the hinge plate 36 may be relatively wide in order to provide a sufficient number of apertures to allow the angle of the backrest frame 8 to be adjusted in relatively small intervals. To save weight, cut-outs 52-54 may be provided in the hinge plate 36. Similarly, the hinge plate 36 may be made relatively tall to position the backrest frame member 27 with its lower end 55 (FIGS. 6 and 7) at a distance to the side frame member 9, with a further cut-out 56 to save weight.

As will be appreciated, there is only one locking mechanism per side for fixing the position of the backrest frame member 27 relative to the side frame member 9. This mechanism is unlocked both to adjust the angle of the backrest frame 8 and to fold the backrest frame 8 down. To make it easier to return the backrest frame 8 to a previously adjusted angular orientation prior to folding, plugs 57, 58 are provided for insertion into selected apertures 44, 45. In the illustrated embodiment, these are large enough to form a shape-fit, interference fit, or snap fit with the apertures 44, 45, but not so large as to hamper movement of the retracted pin 49 past the hinge plate 36. Thus, the user is provided with at least a visible reminder of which apertures 44, 45 are usable and which are blocked. For example, apertures 44, 45 may have had a plug 57, 58 inserted to block the pin 49 from entering and aperture 46 may be open, being the prior use position. In an embodiment, the plugs 57, 58 are fixed in the apertures 44, 45 by a shape-fit, interference fit, or snap fit that is strong enough to hold the plug 57, 58 in place when the biasing force of the pin 49 acts on it. In a further embodiment, a device, e.g. a conical screw (not shown), cooperates with the plug 57, 58 to secure it in the aperture 44, 45, e.g. by expanding it so that it jams tightly in the aperture 44, 45. Alternatively, the screw may be used in place of the plug 57, 58.

The plugs 57, 58 can be of any suitable material, e.g. plastic, metal, or rubber, including synthetic rubber. A resilient material facilitates insertion and retention of the plugs 57, 58 in the apertures 44, 45. In an alternative embodiment, the plugs 57, 58 may be bonded together or integrally formed, in a manner similar to that of a dental bridge.

Figure 4:
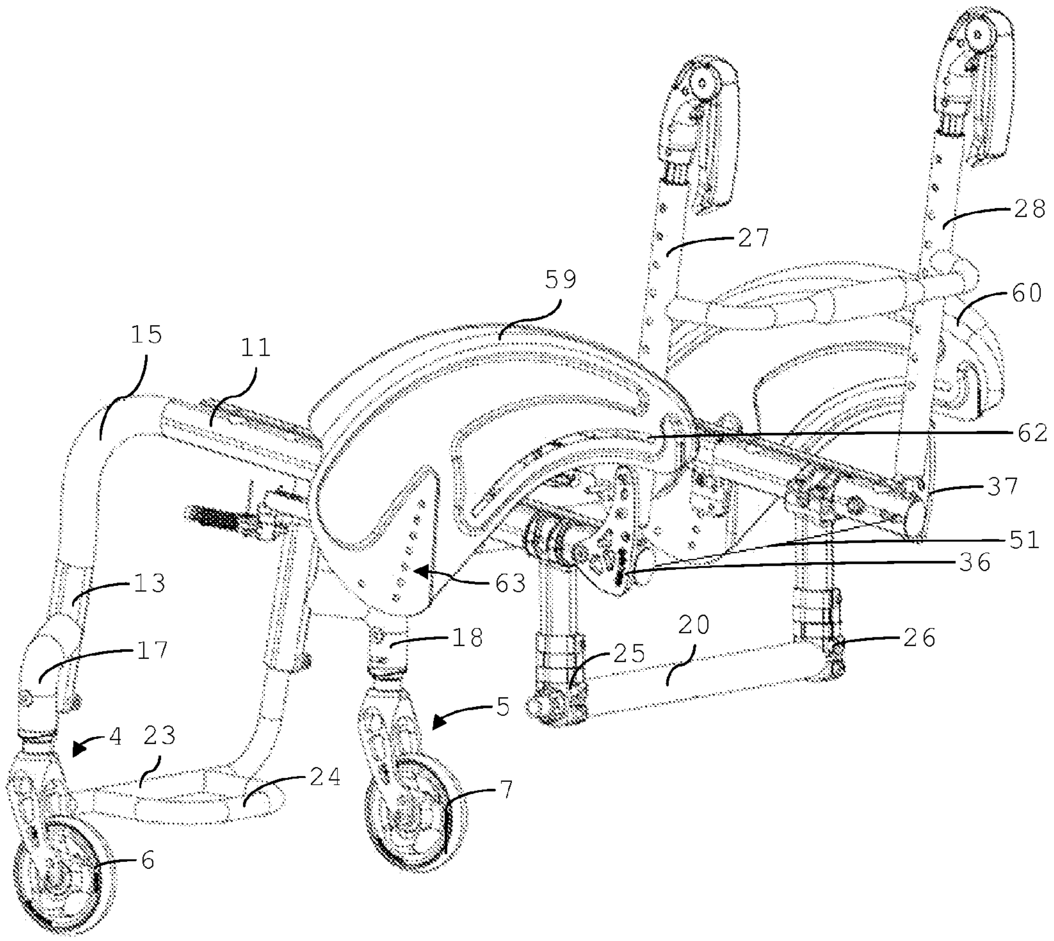
FIG. 4 is a perspective view of an embodiment of a wheelchair frame with both drive wheels removed.

In the illustrated embodiment, the wheelchair 1 is provided with side guards 59, 60, which are supported both by the base frame and the backrest frame members 27, 28. A support pin 61 provided on the backrest frame member 27 travels through a slot 62 in the side guard 59. Because they are fixed to the base frame, the positions of the side guards 59, 60 relative to the main wheels 2, 3 do not change when the backrest frame 8 is folded down. Additionally supporting the side guards 59, 60 on the backrest frame members 27, 28 allows them to be less rigid and avoids the need for extra support structures, thus representing a saving in weight. As shown in FIG. 4, the left side guard 59 is provided with an array of apertures 63 for receiving a pin, screw or bolt fixed to the left side frame member 9. Thus, the side guard 59 can also be re-positioned. Indeed, it can be removed after the rear wheels 2, 3 have been removed, to make the resulting wheelchair frame even more compact. If required, plugs (not shown) can also be provided to block those apertures 63 that are not used. This allows the side guard 59 to be returned to its previous position more easily when the wheelchair is re-deployed after transportation.

Similarly, plugs (not shown) can be provide to block holes of a locking mechanism (not shown) for arresting the movement of the left and right footrest frame members 21, 22 relative to the second legs 13, 14 of the side frame members 9, 10. Thus, the footrest can be removed completely and then returned to its previous position relatively easily.

Figure 9:
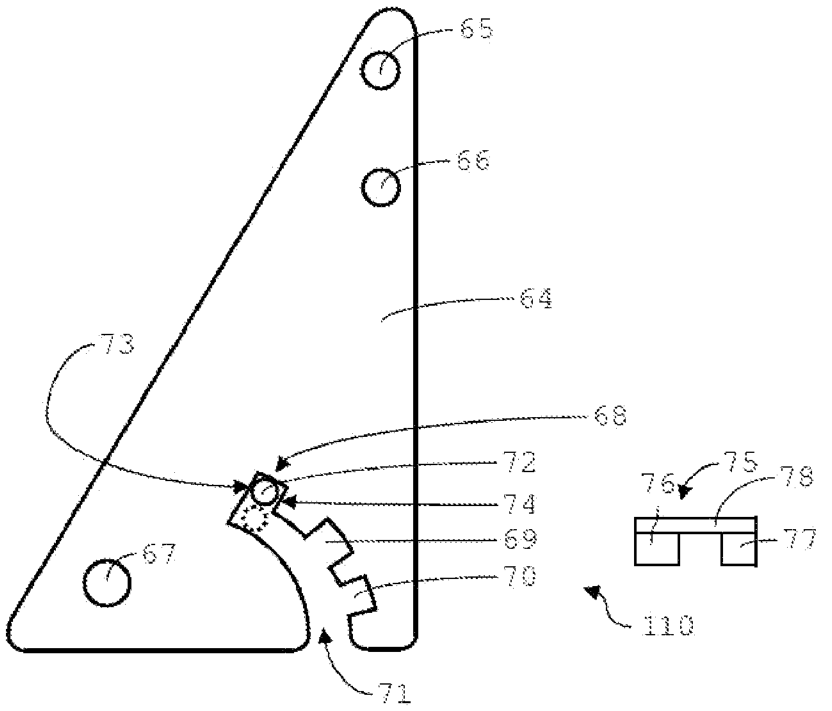
FIG. 9 is an elevational side view of another embodiment of a hinge plate for use in a seatback adjustment mechanism.
Figure 10:
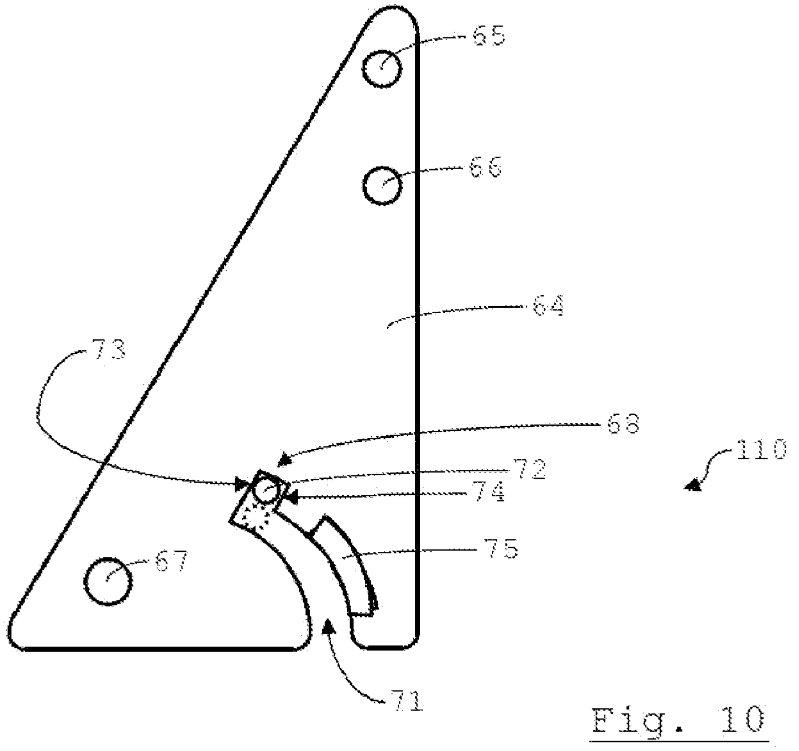
FIG. 10 is an elevational view of another embodiment of a hinge plate with a memory device.

Turning now to FIGS. 9 and 10, an alternative hinge plate 64 is shown. Similar to the other hinge plates 36, 37, hinge plate 64 includes two through-holes 65, 66 for receiving screws, bolts or similar fixing elements to attach the hinge plate 64 to the backrest frame member 27. The hinge plate 64 also has a through-hole 67 for the pivot axle 43. Another embodiment of a locking mechanism 110 includes three apertures 68-70 which are interconnected by a channel 71 for guiding a pin 72, similar to the pins 49, 50 of the detailed embodiment of FIGS. 1-8. This pin 72, as part of the locking mechanism 110, is movable laterally between two positions: one in which the pin 72 is located in the channel 71, and one where the pin 72 engages one of the apertures 68-70. The pin 72 may be moved or resiliently biased into engagement with one of the apertures 68-70 to fix the position of the hinge plate 64 and backrest frame member 27 relative to the first legs 11, 12. In the illustrated embodiment, the pin 72 cooperates with two edges 73, 74 of an aperture 68 to establish a lock. The channel 71 is open at one end to permit movement of the hinge plate 64 past and beyond the pin 72 to permit folding of the backrest frame member 27.

The locking mechanism 110 further includes a plug component 75 that comprises two plugs 76, 77 held together by a bridge 78. The plug component 75 can be provided as a set, e.g. one for each combination of two apertures 68-70 to be blocked. Alternatively, the plugs 76, 77 may be provided singularly to block one aperture. The plugs 76, 77 occupy the apertures 69, 70 so that the pin 72 is unable to engage the edges and thereby permit the hinge plate 64 to continue moving past the pin 72.

As a result, the user is able to adjust the wheelchair 1, fold it into a compact package, and then unfold it to the previous adjusted position without having to memorize or make a note of the various adjustments previously made. Thus, the plugs 76, 77 serve as a mechanical memory for re-establishing the prior backrest adjustment. Because the backrest frame members 27, 28 and the side frame members 9, 10 use a single locking mechanism per side that, when unlocked, allows both adjustment and folding, the connection is simple and lightweight.

Figure 11:
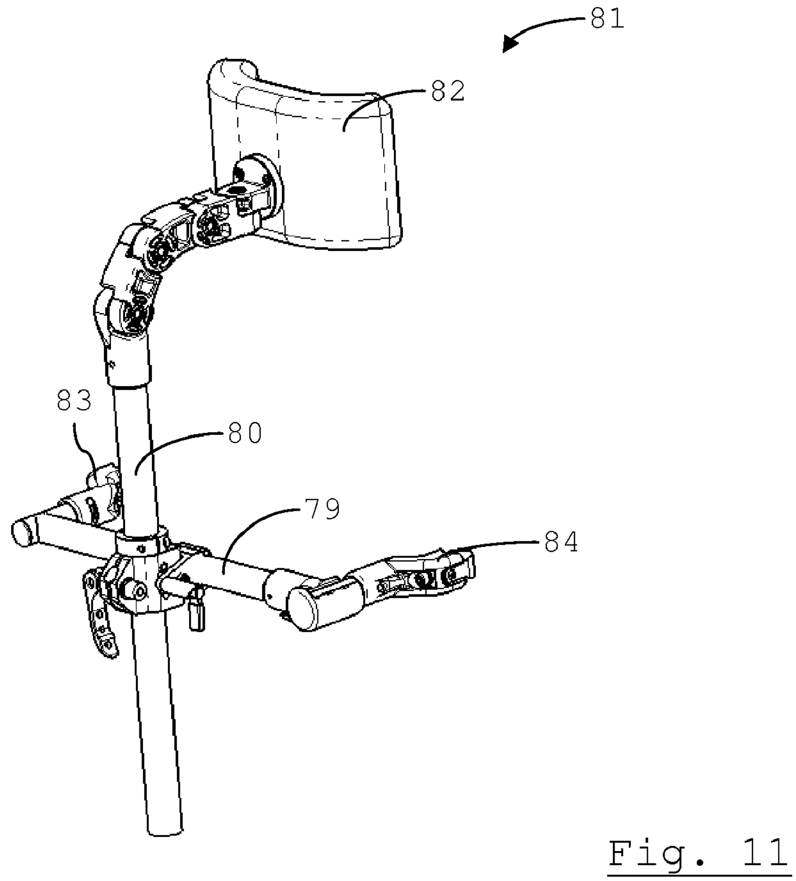
FIG. 11 is a perspective view of an embodiment of a headrest assembly for a wheelchair frame.
Figure 12:
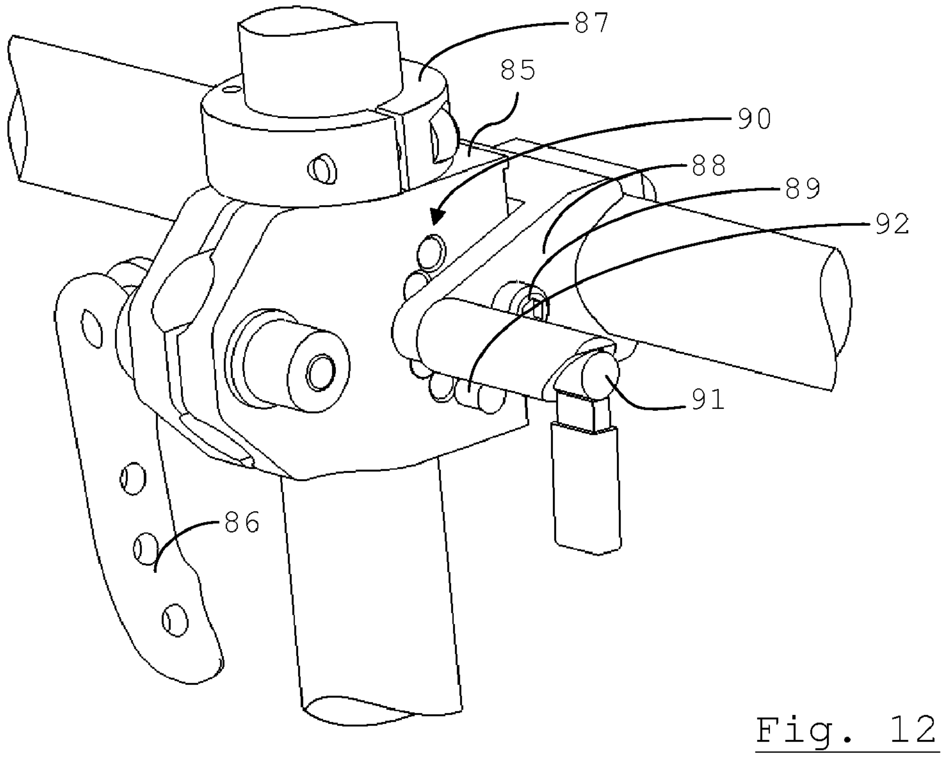
FIG. 12 is an enlarged perspective view of the connection between a cross-member of the headrest assembly and an upright tube of the headrest assembly of FIG. 11.

This same principle is applied to an interconnection mechanism between a cross-member 79 and upright member 80 of a headrest assembly 81 (FIGS. 11 and 12). The cross-member 79 and upright member 80 are of a tubular construction, to save weight without compromising strength.

The headrest assembly 81 comprises a headrest 82 connected to a top end of the upright member 80. The cross-member 79 may be attached to the backrest frame members 27, 28 of the wheelchair 1 by means of connectors 83, 84. The angle of the upright member 80 about a longitudinal axis of the cross-member 79 is adjustable. In particular, this angle can be fine-tuned to provide the appropriate level of support for the head of the occupant in an upright position. However, the headrest 82 can also be swung back over a relatively large distance. Subsequently, the headrest 82 can be returned to the exact same angle for supporting the occupant in the upright position by way of a connection mechanism. The connection mechanism comprises a clamp body 85 that is clamped tight to the upright member 80 by means of a quick-release lever 86, and is further fixed in position by means of a collar 87. The clamp body 85 is pivotally attached to a bracket 88 on the cross-member 79 via at least one pivot axle 89.

Additionally, the clamp body 85 is provided with an array of apertures 90. A pin 91 can be inserted into one of the apertures 90 to fix the position of the upright member 80 relative to the cross-member 79. In the illustrated embodiment, the pin 91 can be retracted axially, and the apertures 90 are not interconnected. In other embodiments, a configuration similar to that of the alternative hinge plate 64 of FIGS. 9 and 10 may be used.

A plug 92 is provided to block one of the array of apertures 90, so that, with the pin 91 retracted, the clamp body 85 can still move past the pin 91, but the pin 91 cannot enter the blocked aperture. Thus, when the headrest 82 has been swung back, it can subsequently be returned to its previous position without the user having to make a note of the position of the pin 91 required to achieve this.

The invention is not limited to the embodiments described above, which may be varied within the scope of the claim. The features mentioned in the description, claims and drawings can be essential to the invention in its various implementations both individually and in any combination.

For instance, the pivot point of the hinge plates 36, 37, and 64 need not be fixed. An adjustable pivot point of the hinge plates 36, 37, and 64 can permit movement of the backrest frame members 27, 28 relative to the side frame members 9, that is not purely rotational.

The array of apertures of the locking mechanisms need not be through-holes, but may alternatively comprise openings or a series of recesses in one of the first and second frame members or in a plate, or similar component, fixed to one of the first and second frame members.

The invention can be applied to the frames of other types of personal conveyances, such as push-chairs for infants, hospital beds, ambulance stretchers, bicycles, tricycles, etc.

Instead of or in addition to making the engagement member retractable, the array of apertures can be made retractable, e.g. by providing the array in a slightly flexible hinge plate or other plate-like component.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A wheelchair comprising:

a base frame having first and second side frame members;

a backrest frame; and a hinge assembly that connects the backrest frame to a portion of the base frame for selective pivotal movement, the hinge assembly including a locking mechanism configured to provide selective discrete locking positions of the backrest relative to the base frame, the locking mechanism including a locking pin and a plurality of cooperating locking apertures, the locking pin being adapted to selectively engage one of the plurality of locking apertures to define a backrest angle relative to the base frame, and one or more plugs adapted to engage one or more of the plurality of locking apertures to prevent the locking pin from cooperating with the plugged locking aperture.

2. The wheelchair of claim 1 wherein the locking mechanism includes a backrest folded position such that the backrest is oriented in a generally parallel orientation relative to a first leg of the base frame.

3. The wheelchair of claim 2 wherein the locking mechanism and the cooperating plugs define a backrest position memory such that the backrest can be returned to an initial backrest position from the folded position by allowing the locking pin to cooperate with fewer than all of the plurality of locking apertures.

4. The wheelchair of claim 3 wherein the plurality of apertures is a plurality of discrete apertures positioned at intervals along a curved trajectory, and the locking pin is configured so that it can be retracted from engagement with the selected aperture to permit pivotal movement of the backrest relative to the base frame.

5. The wheelchair of claim 4 wherein the locking pin is biased into an extended position such that the locking pin engages one of the unplugged locking apertures.

6. The wheelchair of claim 4 wherein the intervals between adjacent apertures is generally constant.

7. The wheelchair of claim 3 wherein the plurality of apertures is a plurality of notches that are interconnected by a channel.

8. The wheelchair of claim 7 wherein the locking pin is configured to be moved from engagement with the selected notch and into the channel to permit pivotal movement of the backrest relative to the base frame.

9. The wheelchair of claim 8 wherein the locking pin is biased into an engaged position with any of the unplugged notches such that pivotal movement of the backrest to the unfolded position causes the locking pin to move within the channel past the plugged notches and engage an unplugged notch.

10. The wheelchair of claim 1 wherein the one or more plugs is a plurality of interconnected plugs configured for generally simultaneous insertion into a plurality of the apertures.

11. The wheelchair of claim 1 wherein the hinge assembly includes a hinge plate having at least two fixing apertures configured to fix the backrest frame member to the hinge plate, the apertures defining at least two ranges of angular adjustment of the backrest relative to the base frame.

12. The wheelchair of claim 11 wherein the hinge plate fixing apertures are an elongated through-hole configured to provide a continuous range of adjustment of the backrest frame member relative to the base frame.

13. A wheelchair comprising:

a base frame having first and second side frame members;

a backrest frame member having a cross member;

a headrest assembly having an upright member configured to support a headrest and a clamp body that connects the upright member to the cross member; and a hinge assembly that connects the backrest frame to a portion of the base frame for selective pivotal movement, the hinge assembly including a locking mechanism configured to provide selective discrete locking positions of the backrest relative to the base frame, the locking mechanism including a locking pin and a plurality of cooperating locking apertures, the locking pin being adapted to selectively engage one of the plurality of locking apertures to define a backrest angle relative to the base frame, and one or more plugs adapted to engage one or more of the plurality of locking apertures to prevent the locking pin from cooperating with the plugged locking aperture.

14. The wheelchair of claim 13 wherein the clamp body includes an array of apertures that define selectable angular positions of the headrest relative to the backrest frame member, a pin configured to selectively engage one of the array of apertures to fix the headrest position and at least one plug configured to engage one or more of the apertures in the array to limit the selectable positions of the headrest.

15. The wheelchair of claim 14 wherein a collar cooperates with the upright member to further fix the position of the headrest relative to the backrest.

16. The wheelchair of claim 14 wherein a bracket is attached to the cross member and the clamp body is supported on the bracket for relative pivotal movement by a pivot axle.

17. The wheelchair of claim 16 wherein a quick-release lever permits selective axial movement of the upright member and the headrest relative to the backrest.

18. The wheelchair of claim 17 wherein the pin is configured to be axially extended and retracted into and out of engagement with a selected one of the apertures of the clamp body to fix the angular position of the headrest relative to the backrest frame member.

19. A wheelchair comprising:

a base frame having first and second side frame members;

a backrest frame member having a cross member;

a headrest assembly having an upright member configured to support a headrest and a clamp body that connects the upright member to the cross member, the clamp body having an array of apertures that define selectable angular positions of the headrest relative to the backrest frame member;

a hinge assembly that connects the backrest frame to a portion of the base frame for selective pivotal movement, the hinge assembly including a locking mechanism configured to provide selective discrete locking positions of the backrest relative to the base frame, the locking mechanism including a locking pin and a plurality of cooperating locking apertures, the locking pin being adapted to selectively engage one of the plurality of locking apertures to define a backrest angle relative to the base frame, and one or more plugs adapted to engage one or more of the plurality of locking apertures to prevent the locking pin from cooperating with the plugged locking aperture; and at least one side guard connected to the backrest frame and the base frame, the at least one side guard having an array of apertures configured for selective attachment to a portion of the base frame.

20. The wheelchair of claim 19 wherein at least one plug is configured to engage at least one aperture of one of the clamp body, the hinge plate, and the side guard to prevent selection of the aperture in a use position of one of the headrest and the backrest.

* * * * *